Figure 1:
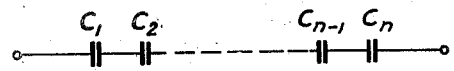

Sept. 21, 1948.　　　　　R. NORDELL　　　　　2,449,817
DEVICE FOR SIGNALING OR RELEASING
BY ELECTRIC POWER CAPACITORS
Filed March 30, 1944　　　　　　　　　　2 Sheets-Sheet 1

Inventor
R. Nordell

Inventor
R. Nordell

Patented Sept. 21, 1948

2,449,817

UNITED STATES PATENT OFFICE 2,449,817

DEVICE FOR SIGNALING OR RELEASING BY ELECTRIC POWER CAPACITORS

Robert Nordell, Sundbyberg, Sweden, assignor to Telefonaktiebolaget L. M. Ericsson, Stockholm, Sweden, a company of Sweden Application March 30, 1944, Serial No. 528,758
In Sweden March 9, 1943

2 Claims. (Cl. 175—294)

The present invention aims at producing a signal or a release when in an electric power capacitor composed of two or several partial capacitors connected in series one of the partial capacitors gets a dielectric break down.

The insulating layers in a capacitor for A. C. is normally made only for a working voltage of one or two kv. Power capacitors for higher voltage are composed of two or several parts connected in series. When the number of parts connected in series increases, the relative rise of current intensity appearing when one partial capacitor is short-circuited for instance because of a break down, is decreased. If for instance eight similar partial capacitors form a power capacitor the current intensity through this one increases 14% when one of the partial capacitors breaks down. By a break down however a gas evolution arises bringing an increase of pressure in the partial capacitor with the break down and therefore this and perhaps the whole power capacitor is destroyed if the fault is not discovered early enough and the capacitor is taken out of service. It is therefore desirable that each power capacitor is combined with a device for signalling eventual faults or for automatic disconnecting of the capacitor. A current fluctuation of 14%, as in the example above, is however not sufficient for a sure signalling arrangement composed of normal means as fuses or excess-current relays. Further the relative rise of line current is considerably less for capacitors connected in three-phase star- or delta connection than for the same number of partial capacitors connected in series to a certain single-phase A. C. voltage, because the current increase is divided over three phases.

Signalling devices are known which by means of sensitive current measuring arrangements are influenced by the current increase by a break down in a partial capacitor. It is further known to use different kinds of unsymmetrical connections in order to cause a release- or alarm signal. As a rule the last mentioned arrangement is however only useful if the number of partial capacitors connected in series is small, 2 or 3. The use of the first mentioned arrangement is limited through the fact that variations of current because of fluctuations or harmonics in the voltage can reach the same amount as the current rise by a break down in a partial capacitor.

The present invention solves the problem above in a simple, sure and entirely satisfactory manner which is achieved by the power capacitor being connected in parallel with a reactance coil and that all or some connecting points between the partial capacitors are connected to terminals on the winding of the reactance coil, terminals are so chosen that, when connecting the capacitor and the reactance coil in an alternating current circuit, the potentials on said terminals correspond to the potential on the said connecting points and that the currents resulting from a short-circuiting of one of the partial capacitors in some of the connecting wires between the reactance coil and the power capacitor affect a current sensitive arrangement causing a signal or a release.

Figure 2:
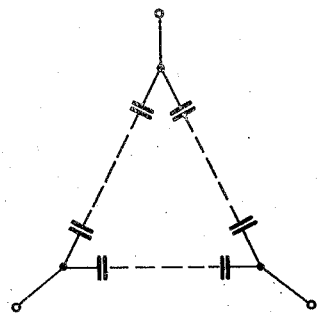
Figure 3:
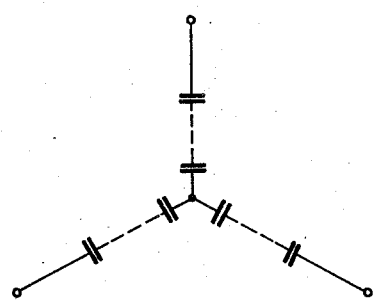
Figure 4:
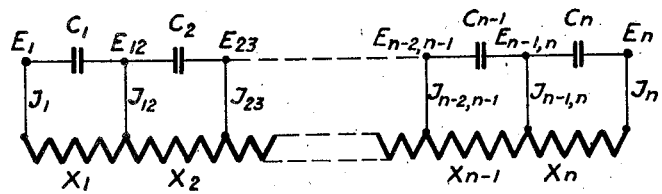
Figure 6:
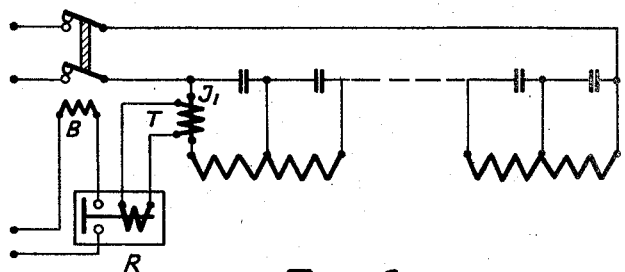

The invention is below more closely described with help of the accompanying drawings. Fig. 1 shows the fundamental construction of a power capacitor with the partial capacitors $C_1$, $C_2$ and so on to $C_{n-1}$ and $C_n$. Fig. 2 and Fig. 3 show a power capacitor connected in delta connection as per Fig. 3. In Fig. 4 the connection of a reactance coil to a power capacitor as per Fig. 1 is shown in accordance with the present invention. The potentials at the terminals of the power capacitor are $E_1$ and $E_n$ and the potential difference $E_1-E_n$ is divided on the capacitors $C_1-C_n$ in such a way that the potentials $E_{12}$, $E_{23}$ and so on $E_{n-2,n-1}$ and $E_{n-1,n}$ appear in the connecting points between the partial capacitors. The winding of the reactance coil is with help of terminals divided in the parts $X_1$, $X_2$ and so on $X_{n-1}$ and $X_n$ in such a way that the potential in the terminal between $X_1$ and $X_2$ is $E_{12}$, between $X_2$ and $X_3$ is $E_{23}$ and so on. The currents $I_{12}$, $I_{23}$ and so on to $I_{n-2,n-1}$ and $I_{n-1,n}$ in a capacitor free from fault are consequently almost zero or at least unimportant. The currents $I_1$ and $I_n$ are unimportant because of the large inductive resistance of the reactance coil. Should however a partial capacitor for instance $C_2$ be short-circuited because of an electric break down, the winding $X_2$ is short-circuited and the voltage induced in $X_2$ gives an efficacious rise of the currents $I_{12}$ and $I_{23}$ and by that of $I_1$ and $I_n$. If a fuse or a relay is put in in any one of the connecting wires which are passed by any one of the currents $I_{12}$, $I_{23}$, $I_1$ or $I_n$, a signal can be arranged announcing the faults in the capacitor $C_2$. In Fig. 6 a current transformer T is shown connected in the connecting wire of the reactance coil corresponding to the current $I_1$ in Fig. 4. If the current $I_1$ is increased to a value corresponding to a short-circuiting of a partial capacitor, a current in the current transformer T is induced that affects the relay R, the contacts of which connect for instance the poles of a battery to the release magnet in an automatic switch B. The switch B is affected and the current to the current transformer and the reactance coil is broken.

Figure 5:
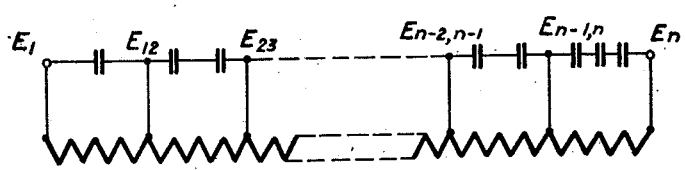
Figure 7:
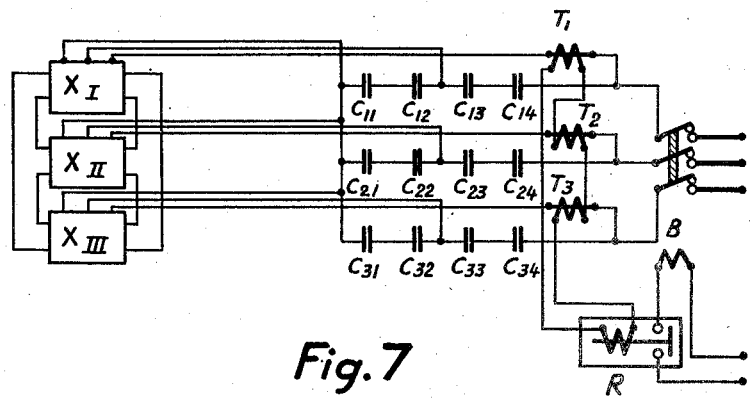

In Fig. 4 a reactance coil with a terminal for each connecting point between two partial capacitors in a power capacitor is shown. It is however often not necessary to furnish the reactance coil with terminals for all such points and therefore in Fig. 5 an arbitrary division of the terminals of the reactance coil is shown wherein however the windings of the reactance coil must be so dimensioned that the terminals get the potentials $E_{12}$, $E_{23}$ and so on as per the figure. For power capacitors in three-phase star- or delta connection according to Fig. 3 resp. Fig. 2 naturally three entirely different reactance coils connected as per Figs. 4, 5 or 6 can be used. It is however more suitable to bring together the windings of the reactance coils on a common iron core in accordance with Fig. 7. The reactance coil in Fig. 7 consists of a core with three limbs and with the windings $X_I$, $X_{II}$ and $X_{III}$ each aimed for one phase in a three-phase power capacitor with the partial capacitors $C_{11}$—$C_{14}$ for phase I, $C_{21}$—$C_{24}$ for phase II and $C_{31}$—$C_{34}$ for phase III. Besides the outside lines to the windings $X_I$, $X_{II}$ and $X_{III}$ of the reactance coil are in the figure one connecting wire for each phase between one terminal on each winding X and one connecting point between two partial capacitors $C_{12}$ and $C_{13}$ resp. $C_{22}$ and $C_{23}$ and between $C_{32}$ and $C_{33}$ shown. In one of the outside lines to the reactance coil for each phase a current transformer $T_1$, $T_2$ and $T_3$ is to be found. The secondary windings on the current transformers $T_1$, $T_2$ and $T_3$ are connected in series and connected to the winding of a relay R. If a partial capacitor for instance $C_{23}$ is short-circuited, a current rise through the primary winding of the current transformer $T_2$ appears and by that a current in its secondary winding whereby the relay R is affected and the winding of the switch B is connected to a current source. When the winding of the release magnet of the switch B is energized the switch is released.

I claim:

1. In an electric power transmission system for alternating current, an electric power capacitor for each phase, said capacitor including a number of partial capacitors all connected in series, and a reactance coil connected in parallel with said power capacitor and influenced by the same A. C. voltage, at least some connecting points between the partial capacitors being connected to terminals on the winding of the reactance coil, the potential of each of said terminals corresponding to the potential of the connecting point between two partial capacitors, to which the terminal is connected, signaling means in at least one connecting wire between the reactance coil and the power capacitor operated by current arising by a short-circuit in anyone of the said partial capacitors.

2. In an electric power transmission system as described in claim 1, having three phases and the reactance coils for all the three phases being windings on a common core.

ROBERT NORDELL.

REFERENCES CITED

The following references are of record in the file of this patent:

UNITED STATES PATENTS

| Number | Name | Date |
|---|---|---|
| 1,483,552 | Pickard | Feb. 12, 1924 |
| 1,900,495 | Gay | Mar. 7, 1933 |
| 1,991,063 | Rudenberg | Feb. 12, 1935 |
| 2,066,522 | Doherty | Jan. 5, 1937 |
| 2,162,488 | Marbury | June 13, 1939 |
| 2,294,099 | Trapp | Aug. 25, 1942 |
| 2,376,201 | Starr | May 15, 1945 |